March 26, 1935.   P. A. ERB ET AL   1,995,448
CULINARY SERVING DEVICE
Filed Sept. 17, 1932   2 Sheets-Sheet 1

INVENTORS
Philip A. Erb
and
Ernest O. Shilling
BY
C. F. Heinkel
ATTORNEY

March 26, 1935. P. A. ERB ET AL 1,995,448
CULINARY SERVING DEVICE
Filed Sept. 17, 1932 2 Sheets-Sheet 2
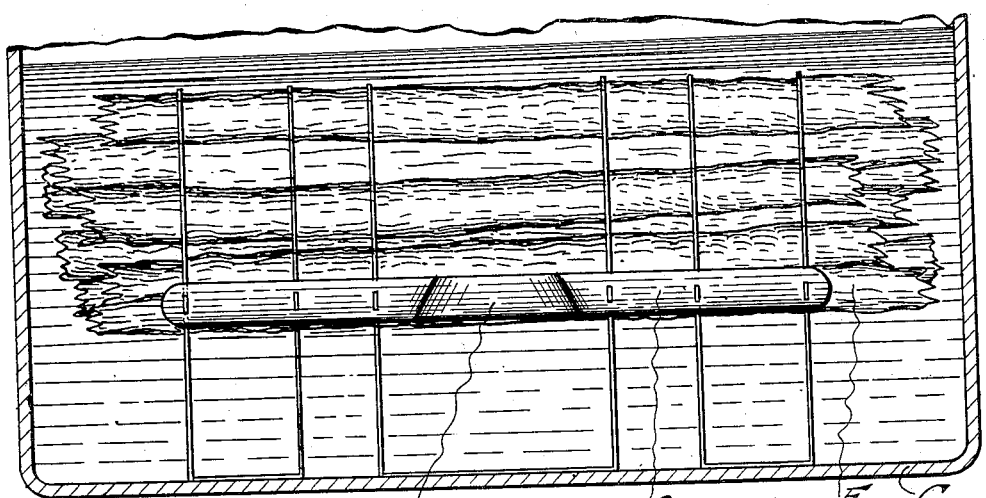
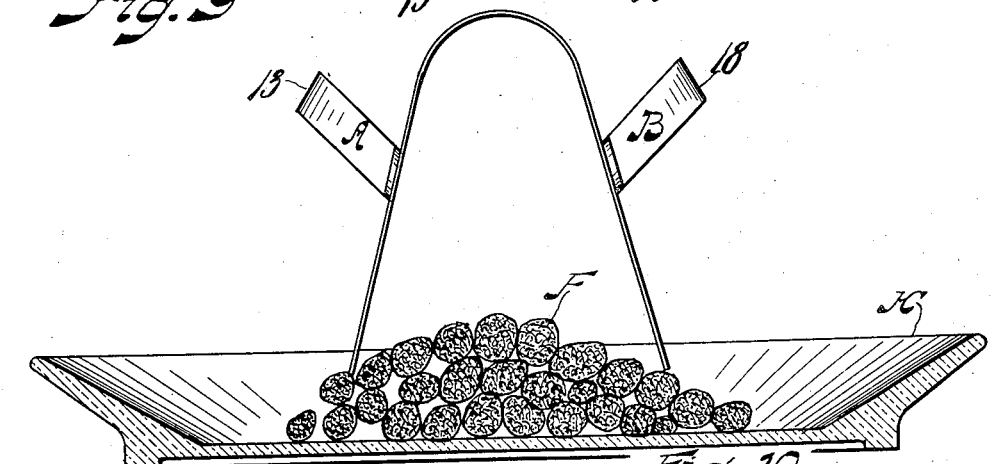
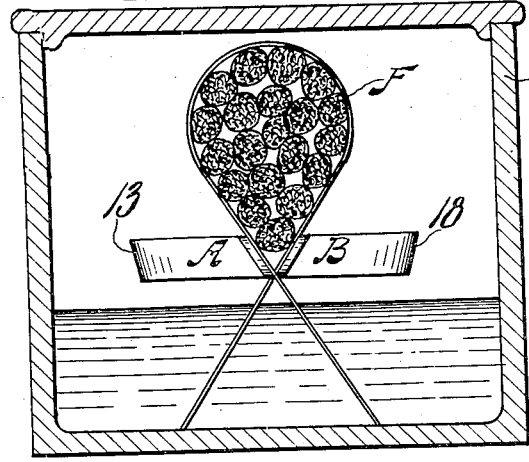
INVENTORS
Philip A. Erb
and
Ernest O. Shilling
BY
C.F. Heinkel
ATTORNEY Patented Mar. 26, 1935

1,995,448

UNITED STATES PATENT OFFICE 1,995,448

CULINARY-SERVING DEVICE

Philip A. Erb, Cleveland Heights, and Ernest O. Shilling, South Euclid, Ohio

Application September 17, 1932, Serial No. 633,568

13 Claims. (Cl. 53—1)

Our invention relates to devices useful in the culinary serving and similar arts particularly for stem like materials.

The object of our invention is a simple and efficient device, sanitary in operation and use; which serves the purpose of first assembling stem like material to be prepared without necessity of tying the same into bundles or the like, then preparing the material while in that assembly; then releasing and serving the prepared material from the device without the need of human fingers touching the material after the same is assembled in the device; which reduces labor in preparing and serving of the material; which determines the quantity of material, at least roughly; which guides material into the device when the same is open for reception of material; which is self closing and manually opened for reception and discharge of material; and in which the material embracing part thereof is made of thin material so as to cover as little as possible of the surface of the material in the device.

Other objects will be pointed out in this specification or will become obvious or apparent upon an inspection of this specification and the accompanying drawings.

In the prior art, preparing materials, such as stem like edibles, and serving the same does require some handling with human hands or fingers such as first ascertaining the number of pieces to be assembled, then tying the same into a bundle, then preparing the bundle by cooking or otherwise, then untying the bundle and finally serving. This method is, or at least may become, quite unsanitary and is quite objectionable particularly in serving.

In our invention, no handling with hands or fingers is necessary during the time the raw material is placed in the device and the prepared material is actually served at a table.

For illustration purposes, we have shown in the accompanying drawings and described in this specification one type of device well adapted for preparing and serving asparagus and similar material. It is understood, however, that the principle of this invention can also be used for other materials, edible or otherwise, of the general form of asparagus and can be modified for materials differently formed than asparagus.

In the accompanying drawings:

Fig. 9 is a vertical section through a pot, showing a device of Fig. 1 therein and a bunch or bundle of material in the device and completely immersed in liquid therein for cooking.

Fig. 10 is a vertical section of a serving plate showing the device of Fig. 1 opened above the plate and the material dropped out of the device and into the plate.

Fig. 11 is a vertical section through a pot, showing the device of Fig. 1 therein and holding a bundle of material above the liquid level in the pot.

Similar reference characters refer to similar parts throughout the views.

Figure 1:
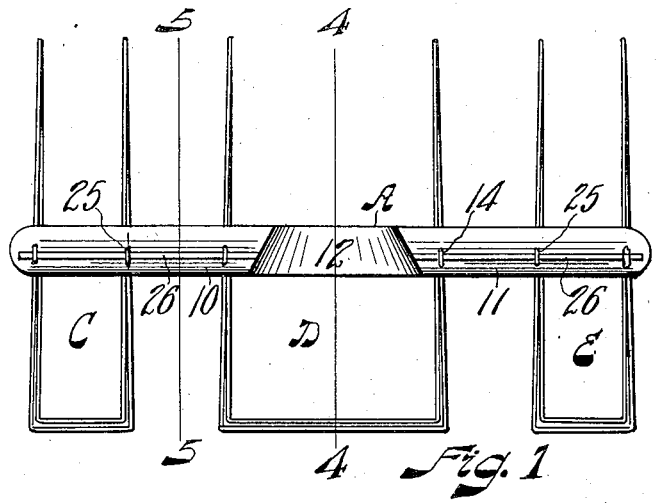
Fig. 1 is a side view of a cooking and serving device embodying our invention.

The device shown in the accompanying drawings is well adapted for use in cookery and in serving or dispensing such materials as asparagus.

The device shown in the accompanying drawings comprises the sidewise spaced pair of bar members A and B and the material embracing or holding and releasing members C, D, and E.

The bar A comprises the two longitudinally aligned portions 10 and 11 connected by the middle portion 12 which is bent outwardly of the device to provide a take hold means.

The outer part 13 of the portion 12 is made round or arcuate to conform to and be convenient for an operator's fingers in opening of the device as will be explained below and the part 13 is as far laterally outward as possible so that the same may cool more quickly than the material in the device to render the device more convenient for serving when a waiter or servant takes hold of the same for serving as will be further explained herein below. The slots 14 are provided through the bar A for the purpose appearing herein below.

The bar B is formed similar to the bar A and for the same purpose. The aligned portions are designated as 15 and 16. The outwardly bent portion is designated as 17, the arcuate part as 18, and the slots as 19. The portion 17 extends outwardly of the device also in the opposite direction of the portion 12 of the bar A.

As shown, the members C and E are alike but the member D is wider than the members C and D; the object of this being to provide more space in the middle of the device for an operator's fingers to take hold of the portions 12 and 17 so that the material in the device need not be touched by the fingers of an operator.

A description of the member E also applies to the members C and D since the structure and object thereof is the same in all of the members C, D, and E.

The member E comprises the material embracing portions 20 and 21 in this instance formed round or loop shaped and of a size to comprise a measuring means for a definite number of stalks or stems of asparagus or bundles of materials previously assembled by freezing or tying or otherwise. It is obvious that a certain number of other elongated materials, wieners for instance, can also be measured by or ascertained by the size of the loop so that the device in a way also acts or serves as a measuring device.

The legs of the portions 20 and 21 are extended to form the foot portions 22 and 23 as shown. The member E is made of one piece of material and the ends thereof, after forming the member E, may be twisted upon each other, or welded together as seen at 24. The object of this being to eliminate all free ends of the material so that they will not injure an operator nor catch on adjacent objects or interfere therewith.

The member E is made of thin resiliently flexible material and the legs cross each other to normally close the loop portions.

Each of the legs on one side has a part thereof bent outwardly to form a part of a loop 25 and this part or loop extends through the slots in the bars. The pins 26 and 28 extend through the loops adjacent to the bars and hold the legs against the bars and in proper relation thereto as clearly seen in Fig. 7.

One of the foot portions is made a little shorter and a little narrower than the companion foot portion so that one can pass through the other in the act of opening the material embracing portions 20 and 21.

The device is adapted to be opened for insertion therein of raw material and to measure the quantity of material inserted therein by the size of the material embracing loop, closes itself to diametrically embrace the material therein, and to be opened for release or serving to let the material drop out of the device after the same is prepared without human fingers touching the material after the raw material has been placed into the device.

Each of the legs on the other side of the members C, D, and E have depressions 27 therein; also of a semi-loop formation. The semi-loops extend through the corresponding slots in the bars and the pins 26 and 28 are inserted through the semi-loops and lie adjacent to the bars to hold the legs against the bars so that movements of the bars, respective of each other, will cause the legs to move with the respective bar to open the members C, D, and E.

Figures 7, 8:
Fig. 7 is a fragmental section showing one joint between the legs and the bars.
Fig. 8 is a fragmental section showing a soldered fastening between the legs and the outside of the bars.

It is, of course, quite obvious that the legs could be welded or soldered or otherwise held onto the bars, as shown in Fig. 8 for instance where the legs are on the outside of the bars. We use the specifically described structure of leg and bar connection solely for the reason that the members C, D, and E can easily be replaced when broken or to substitute differently sized or differently formed members in place thereof.

Figure 2:
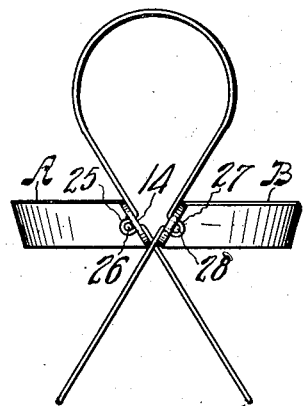
Fig. 2 is an end view of the device of Fig. 1.
Figure 3:
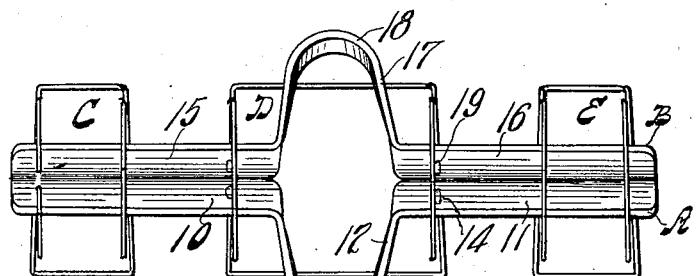
Fig. 3 is a plan view of the device of Fig. 1.
Figure 4:
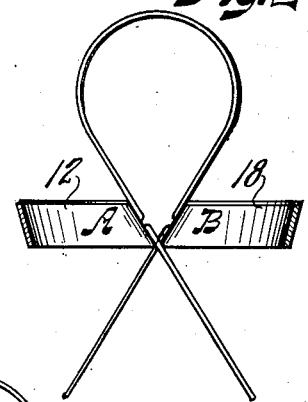
Fig. 4 is a transverse section taken on line 4—4 of Fig. 1 and indicates in dotted lines the device opened to let the material drop out of it by gravity.
Figure 5:
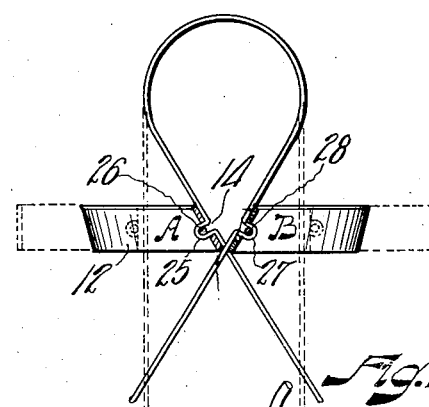
Fig. 5 is a transverse section taken on the line 5—5 of Fig. 1.
Figure 6:
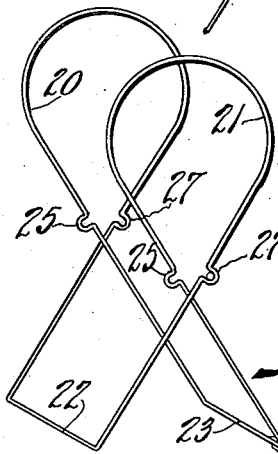
Fig. 6 is a perspective view showing the general structure of the holding and releasing members.

In operation: An operator first takes the device and holds it in a position invertedly from the position shown in Figs. 2, 4 or 5; then places the thumb of one hand on the inside of the rounded part of one of the bars and another finger against the inside of the rounded part of the other bar. An outwardly or separatively directed pressure of the fingers increases the lateral spacing of the bars A and B and this increased spacing takes the legs along and opens the portions 20 and 21 to permit insertion into the device of raw material prior to preparation thereof. The legs and foot portions act as guides to lead the raw material into the device.

After the device is loaded with raw material there is no need to touch the material with human fingers again, not even in serving.

When the raw material is in the device, the outward pressure of the fingers is released whereupon the portions 20 and 21 close themselves and embrace the material therein and the legs and foot portions cross each other to effect the closing as is seen in Figs. 9 and 11 wherein the material F is shown bunched or bundled in the device.

When the device is so loaded and closed, it is inverted so that the legs depend downwardly and afford a rest or support for the device on the bottom of a pot or pan G and space the device above the bottom so that cooking fluid or the like can have equal access to any part of the material. The members 20 and 21 are made of material which does not cover too much of the material in the device to prevent the material from developing a streaky appearance during cooking.

The device with the material therein is placed into the pot or otherwise connected with a preparing means to render the material edible either by complete immersion as shown in Fig. 9, or by no immersion as shown in Fig. 11 as may be best for the material being treated.

When the material is so prepared, the device is removed from the pot by means of a fork or the like and made ready for serving if any further making ready is necessary.

When the material is so removed from the pot, a waiter or servant takes the entire device to a table to be served; then takes hold of the parts 12 and 13 and pulls oppositely outward whereupon the foot portions will separate and open the embracing portions and let the material slide or drop out of the embracing portions and along the legs and onto the plate H (Fig. 11) without the waiter or servant touching the material.

We prefer to make the device of non-oxidizing material or to plate the device with non-tarnishing material so that the same will always remain sanitary and present a clean and pleasing appearance.

Applicants are aware that the principle of this invention can be applied to other devices of an analogous nature and that changes and modifications can be made in the device shown and described within the spirit of this invention and the intent of the appended claims. Therefore, without limiting ourselves to the application of our invention as shown and described nor to the precise structure and arrangements of parts as shown and described.

We claim:

1. Laterally spaced members, each having a loop part to diametrically embrace stem like material, legs extending from said loop parts and crossing each other to close the loop and forming feet to retain the loop above a support, and means for simultaneously opening all of said loop parts for reception thereinto and release therefrom of material.

2. Laterally spaced loop formed members adapted for opening and closing thereof for reception and retention and release of stem like material and a pair of bars each bar engaging one side of said members to retain the same in spaced relation and to provide a means for simultaneously opening and simultaneously closing the same.

3. Laterally spaced loop formed self closing members adapted for reception and retention and release of stem like material and a pair of bars each bar engaging one side of said members to retain the same in spaced relation and to porvide a means for opening the same simultaneously.

4. Laterally spaced members adapted for reception and retention and release of stem like material and a pair of bars each bar having an outwardly bent part substantially in the longitudinal middle thereof to form a handle means for the bar and each bar engaging one side of said members to retain the same in spaced relation and to provide a means for simultaneously opening and simultaneously closing the same.

5. A device of the character described having self closing, normally closed loop members, adapted to close themselves to embrace material therein and to be opened to receive material therein and to release material therefrom when open, of resilient material to adapt the same for opening and self closing and being laterally spaced, axially of the device, for effective holding of long material therein, a connecting means for retaining said members in the spaced relationship thereof, and a take-hold means on said connecting means for manually opening said members.

6. A device of the character described having self closing, normally closed loop members, adapted to close themselves to transversely embrace stem like material therein and to be manually opened to receive the material thereinto and to release the material therefrom, of resilient material to adapt the same for opening and closing thereof and being laterally spaced, axially of the device, for effective retaining of the material therein, a connecting means engaging each of said members to retain the same in the spaced relationship thereof and to move the same simultaneously, and a take-hold means on said connecting means to open said members simultaneously.

7. A device of the character described having a plurality of members relatively spaced axially of the device for engaging stem like material at different places along the length thereof, each of said members having a loop part to bunch the material and to retain the bunching thereof, each of said loop parts being resilient to close itself upon the material, a connecting means secured to all of said members to retain the same in their relative spacing, and a take-hold means on said connecting means for manually moving said connecting means and thereby opening said loop parts.

8. A device of the character described having a member adapted to embrace material therein, said member being made of resilient material and having a self closing loop part, leg parts on the ends of said loop part and normally crossing each other due to the resiliency of said loop part, a foot part on the ends of said leg parts for upright support of the device, means for manually spreading said leg parts to open said loop part for reception of material thereinto and release of material therefrom, and said leg parts forming a guide for directing material into and out of said loop part.

9. A device of the character described having a plurality of material holding and device supporting members, laterally spaced to contact stem like material at different places along the length thereof, each covering a minimum of area of the material, each made of one piece of resilient material, and each comprising a normally self closing loop part to embrace material, leg parts adjacent to said loop part to retain said loop part above a floor and normally crossing each other to close said loop part, and a foot means on the ends of said leg parts for supporting the device upright, and means for manually and simultaneously separating said leg parts and opening said loop parts for reception of material into and release thereof from the device.

10. A device of the character described having a plurality of laterally spaced, one piece, self closing, material embracing members, a connection for holding said members in laterally spaced relationship, each of said members made of resilient material for self closing thereof, and means on said connection for manually opening said members.

11. A device of the character described having a plurality of laterally spaced, one piece, self closing, material embracing members, a connection for holding said members in laterally spaced relationship, each of said members made of resilient material for self closing thereof, each of said members made of one piece of material formed into a material guiding leg part and a device supporting part to retain said material embracing part above a floor, and means on said connection for manually opening said members.

12. A device of the character described having a plurality of laterally spaced, self closing, material embracing members, each of said members made of resilient material for self closing thereof, each of said members made of thin material to minimize the contact area thereof on the material therein, legs and feet on said members to support the material in said members above a floor, a pair of bars, each secured to each of said members, and means on said bars to open said members simultaneously.

13. A device of the character described having laterally spaced, individually self closing, normally closed members, each forming a loop and all adapted to embrace a bundle of stem like material, each of said members formed of one piece of resilient material to effect the embracing of the bundle of material, and means for manually opening said members simultaneously for reception of a bundle of material thereinto and release therefrom.

PHILIP A. ERB.
ERNEST O. SHILLING.